Dec. 11, 1923.
T. M. DEGHERI
1,477,322
EDUCATIONAL AND AMUSEMENT DEVICE
Filed Feb. 10, 1922    2 Sheets-Sheet 2
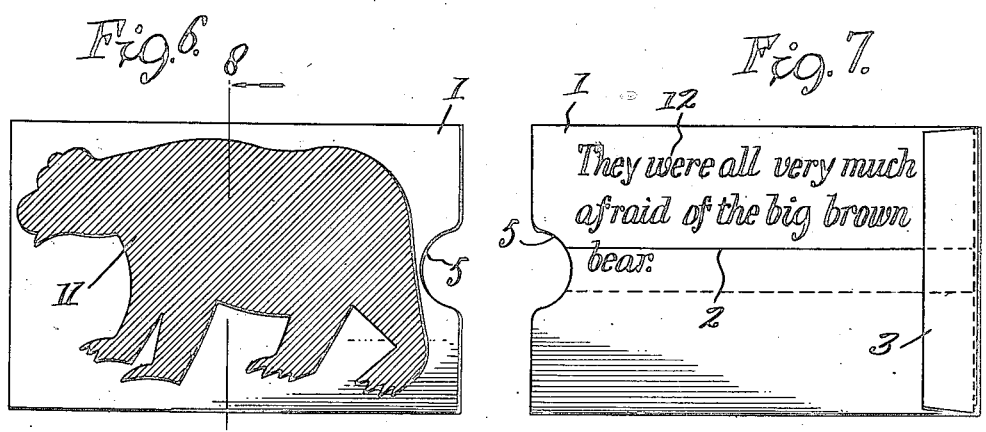
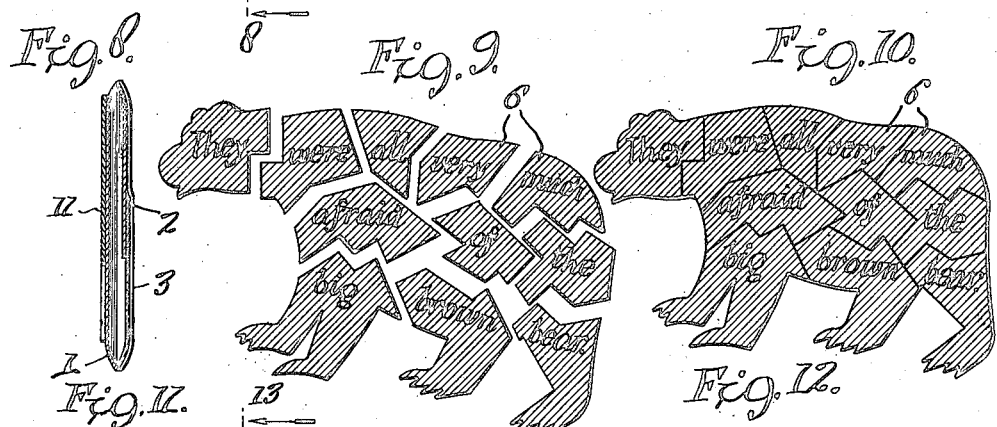
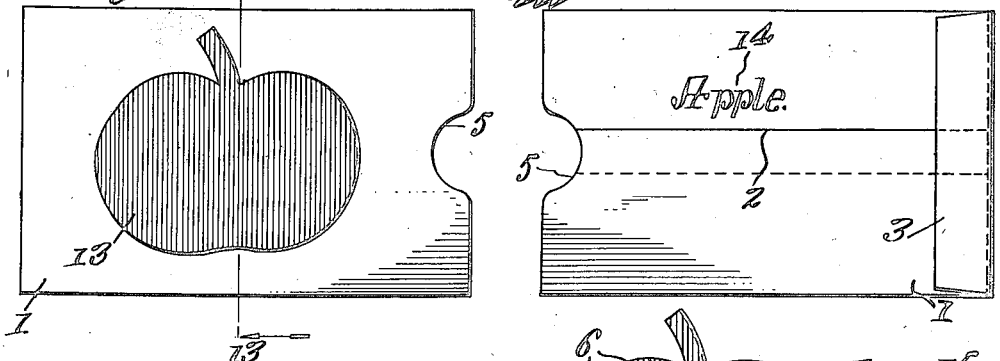
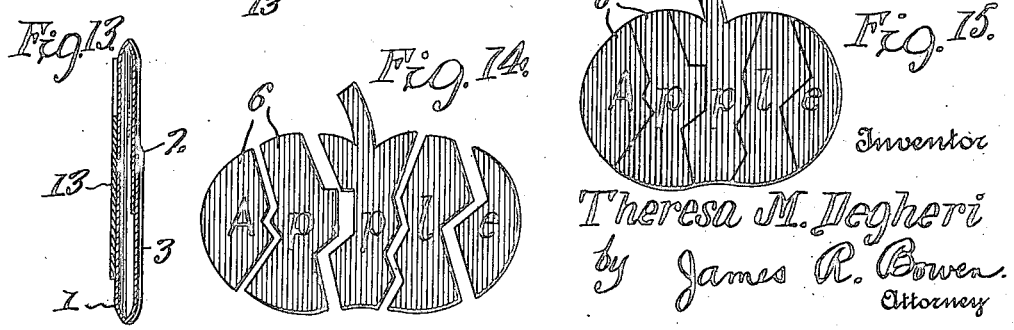
Inventor
Theresa M. Degheri
by James R. Bowen.
Attorney Patented Dec. 11, 1923.

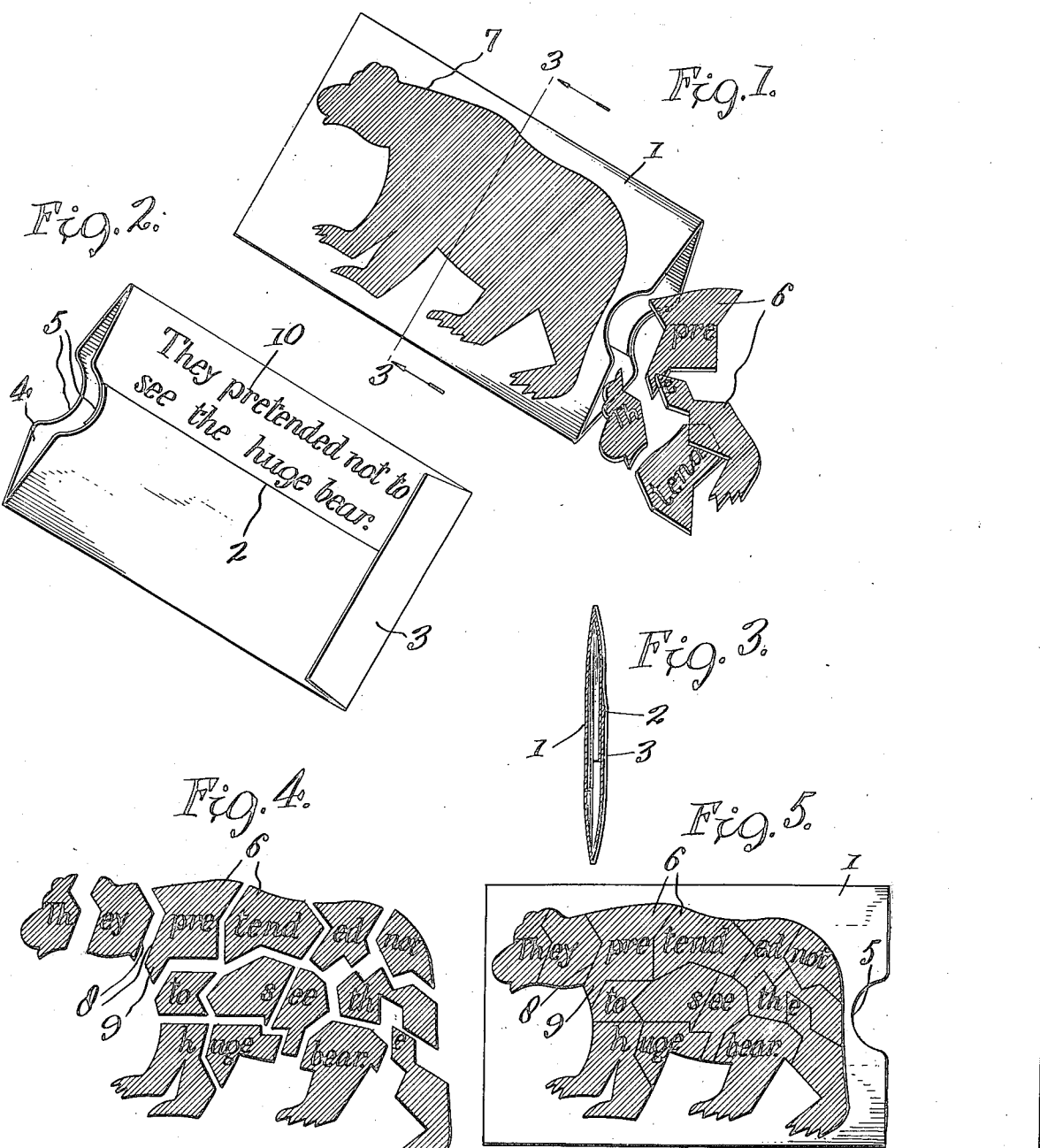

1,477,322

UNITED STATES PATENT OFFICE.

THERESA M. DEGHERI, OF HOBOKEN, NEW JERSEY, NOW BY MARRIAGE THERESA M. O'TOOLE.

EDUCATIONAL AND AMUSEMENT DEVICE.

Application filed February 10, 1922. Serial No. 535,533.

*To all whom it may concern:*

Be it known that I, THERESA M. DEGHERI, a citizen of the United States, residing at Hoboken, in the county of Hudson and State of New Jersey, have invented certain new and useful Improvements in Educational and Amusement Devices, of which the following is a specification.

The present invention relates to improvements in educational and amusement devices in which a great deal of helpful instruction may be provided for young children, while rendering the act of teaching less laborious and also yielding a form of engrossing entertainment for the adult mind.

It is an object of the invention to provide an instruction device which may be used in connection with the modern method of what is known as "group teaching." This modern method enables one group of pupils at a time to come under the personal supervision of the teacher. It is desirable that during that time, the pupils comprising the other group should be kept occupied with work which will be interesting and be instructive as well. It is an aim of the present invention to provide a device which may be given children to work out or solve during the time that the teacher is engaged with a group in the manner just explained.

Another object of the invention lies in providing a compact, simple and inexpensive device which will be appropriate for dispensing to, and subsequently collecting from children, and which will admit of being placed in a restricted space in a classroom.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a perspective view of one form of an educational and amusement device as constructed according to the present invention;

Fig. 2 is a perspective view showing the reverse side of a container;

Fig. 3 is a cross sectional view taken on the line 3—3 in Fig. 1;

Fig. 4 is a plan view showing pieces of a device in process of assembly;

Fig. 5 shows pieces completely assembled upon a key figure on the obverse face of a container;

Fig. 6 is a plan view of the obverse face of a slightly modified container;

Fig. 7 is a reverse face of the same;

Fig. 8 is a transverse section taken on the line 8—8 in Fig. 6;

Fig. 9 shows a diagrammatic view of a partial assembly of pieces contained in this container;

Fig. 10 shows the close assembly of the same pieces;

Fig. 11 is a plan view showing a further modified form of a container;

Fig. 12 is a reverse view of the same;

Fig. 13 is a section on the line 13—13 in Fig. 11;

Fig. 14 is an open assembly view of pieces; and,

Fig. 15 is a closed view of the same.

Referring more particularly to the drawings, 1 designates a container which may be of heavy paper or other appropriate material having any suitable construction, for instance an over-lapped body portion 2 and a sealed end enclosing flap 3. The mouth 4 of the container is shown as left open and thumb and finger notches 5 are shown as made in the side walls of the container adjoining the mouth 4. A number of pieces 6 of cardboard or other suitable material and of an irregular nature may be contained within the container 1, and such pieces may be put in and removed freely through the open mouth 4. These pieces 6 are shown as particularly irregular in their meeting edges and adjacent pieces are shown as matched as to the configuration of their edges in order that they may interfit with one another and form, when all assembled, a composite whole which produces in outline a figure, a picture or representation of an object, the counter-part of which may be upon the obverse face of the envelope 1.

For instance in the form of the invention shown in Figs. 1 to 5 inclusive, the object is a bear represented as indicated at 7 upon the envelope in Fig. 1. This representation is shown as lined to indicate the color brown and it is desirable, as being of interest to the child, although not necessary, to have the object represented in color. The color of the object may also be found especially desirable where information is imparted in connection therewith as displayed in connection with Figs. 7, 9 and 10, the object of which will be later explained.

The pieces 6 as shown in Figs. 4 and 5, have irregular meeting edges 8 and are disposed in rows if desired, and certain of the pieces 6 of one row are shown as provided with tail pieces 9 which project into an adjacent row and assist to form the design with the pieces disposed in that row. The irregularly shaped pieces 6 may have parts of letters, letters, words, or parts of words thereon. For instance in Figs. 4 and 5 two of the pieces at the left end of the top row are shown as utilized to display the word "They." Two letters of this word are shown as placed upon each of the pieces and the word is not complete until the pieces are interfitted as represented in Fig. 5. On the other hand, the last piece to the right in the top row is shown as containing the entire word "Not." The words, letters or parts of words are shown as forming and completing a sentence when the pieces are interfitted in appropriate relation to form the object 7 depicted upon the obverse face of the envelope 1, and the sentence may be such as to bring before the mind of the pupil the object represented. In this way, the object 7 represented upon the envelope forms one key, the sentence upon the pieces forms a second key and the peculiar conformation given to the meeting edges 8 of the pieces constitutes still a third key for the solution of the problem presented to the mind when the pieces are first dumped from the envelope.

A still fourth key may be provided by a legend as 10 upon the rear or reverse face of the envelope, as shown in Fig. 2. This legend is the sentence which the pieces in their assembled form go to make up. The pictorial representation of the object may be upon one face of the envelope, and the legend may be upon another face thereof so that either one or the other key may be presented to the child, or the envelope may be removed entirely so as to preclude the pupil having the benefit of either key. As shown in Fig. 1, the representation of the bear 7 is received directly upon the material of the envelope body and it may be printed, drawn, lithographed or otherwise placed thereon.

In Figs. 6 and 8, a bear is shown as contained upon a separate piece 11 of cardboard or other material. This cardboard is shown as cut out to the outline of the object which it is desired to represent in conjunction with the pieces and the cardboard or other material may be colored to conform to a natural hue of the object. In this case, the envelope may be of substantially the same construction and similarly numbered, although it is to be understood that any suitable envelope or container may be used for the purpose. In Fig. 7, a different legend 12 is shown as provided upon the reverse face of the envelope and this legend or sentence corresponds to that borne by the pieces shown in Figs. 9 and 10. In this case, each of the pieces is shown as containing an entire word although a different distribution of the letters upon the pieces may be made.

The pieces are also represented in the same color as the object upon the envelope. By having two sets of pieces, for instance as shown in Figs. 4 and 9, representing the same object, but containing a different sentence and a difference in the conformation of their meeting edges, a more involved task is provided for the advanced pupil.

In Figs. 11 to 15, the object is shown to be an apple 13 represented in red upon a raised cardboard or other material cut to the outline of this object and pasted or otherwise secured to one face of the envelope. The opposite face of the envelope shown as having the word "Apple", as at 14, or other word denoting the object 13. The pieces shown in Figs. 14 and 15 are cut out appropriately as to their meeting edges to present a problem to the mind for assembly in their proper order.

In use, while a teacher employed in an elementary school is engaged in intensive instruction of a small group of pupils out of a large class which she is supervising, she individually invests the rest of the pupils not forming members of the particular group under instruction, with an envelope containing pieces as described above, which envelope may have thereon the representation of an object or a legend, or both. If the representation of the object upon the envelope be, for instance, a horse it may be white, black or brown. Preferably there will be no letters or words on the representation of the object portrayed on the envelope. The child will associate the picture on the envelope with the object represented by such picture. For a very immature child, a simple problem, such as presented by the device illustrated in Figs. 11 to 15, may be presented which involves the mere association of a single word with an object and the formation of the object and necessarily the word by the correct assembly of the pieces.

Of course, a person who knows how to spell "Apple" would first pick out the piece "A", but the child who is unacquainted with the spelling would not be apt to so readily start with that piece. The interfitting of the pieces to form the object will probably be the first appeal to the young mind and if the pieces have been properly arranged the word "Apple" has been formed and the child learns to associate the arrangement of the letters with the object.

A more advanced child might be given one of the envelopes on which is the representation of a bear. If a child were given the envelope on the back of which is written "They were all very much afraid of the big, brown bear," it would manifestly require some attention for a child to so arrange the pieces contained in the envelope that they would form the object shown on the envelope. An adult would be put to some pains to make the arrangements particularly if he did not previously know the sentence which would appear when the pieces are properly arranged. When the child is forming the object he is also forming a sentence which he may read after completing the object.

To make the work more difficult, as the child advances, two or more of the same object, consisting of pieces of different shapes and with different sentences thereon, might be placed in one envelope. For instance, the pieces shown in Figs. 4 and 9 might be placed in the same envelope. The child is called upon to form two bears and when the pieces are properly arranged, he will have composed two sentences.

An adult unaided by information as to the sentences which will be formed (and he can refuse to receive this information by turning the reverse side of the envelope down) will find that the work is engrossing and that a great deal of entertainment and amusement is to be derived therefrom.

The child is taught to work with his hands, is made familiar with the general appearances of animals and other objects, and while he is forming an object he is forming a sentence. Preferably the object which a child is asked to form will be an object about which the child is reading in his book.

The envelope with the object thereon forms a very desirable background upon which to lay the pieces 6 as shown in Fig. 5, the outline of the picture being thus a guide to aid the child in making a proper selection of the pieces. Of course, any arrangement or lettering or wording may be placed upon the pieces and two or more words may be contained on each piece if desired.

Instead of placing a word or sentence on one face of a container a symbol may be placed on the container and the teacher provided with a key to the symbols. This key will indicate to the teacher the word or sentence which the proper interfitting of the pieces contained in the container will form; for instance, instead of having "They were all very much afraid of the big, brown bear," a container might have merely a symbol as "1" or a letter as "a", and by referring to the key number 1 or key letter $a$ the teacher can readily tell the sentence which will be formed by the proper interfitting of the contents of the container.

And instead of having the representation of an object on each container a single representation of an object might be presented to several children. For instance, children might be given containers upon which nothing appears but a key symbol. The contents of these containers when properly interfitted might form representations of bears, and the representation of a bear might be placed on the wall or blackboard of a class-room, thus advising the children of the object they are to form by the proper interfitting of the pieces in the containers. The containers furnished the children might contain similarly shaped pieces so that each child might form the same sentence, or the pieces might be differently shaped so that each child may form a different sentence, or two or more of the same object consisting of pieces of different shapes might be placed in one container to enable a child to construct two or more sentences.

If desired each of the pieces may contain a symbol to denote the container into which the piece may be placed when not in use.

It is obvious that various changes and modifications may be made in the details of construction and design of the above specifically described embodiment of this invention without departing from the spirit thereof.

What is claimed is:

1. An education and amusement device comprising an envelope having a legend on one face, and a number of pieces adapted to be contained in the envelope and having irregularly shaped interfitting edges, said pieces when assembled adapted to form in outline an object and further each piece having a portion of the legend such that when the object is completed by the proper assembly of the pieces the legend will appear upon the combined pieces as it is upon the envelope.

2. An educational and amusement device comprising an envelope having an object portrayed on one face thereof and a legend on the other face thereof, and a number of irregularly shaped pieces contained in the envelope and adapted to be assembled together in a definite relation to form in outline the same object portrayed on the envelope and further each piece having a portion of the legend such that when the design is completed by the proper assembly of the pieces the legend will appear upon the combined pieces as it is upon the envelope.

3. A combined educational and amusement device comprising an envelope, said envelope having an object portrayed on one face thereof and with a legend displayed upon the opposite face whereby either the object or the legend may be placed face down out of sight, and pieces adapted to be contained in the envelope and having irregularly shaped interfitting edges, said pieces when assembled adapted to form the object borne by the envelope and to contain the legend also appearing on the other face of the envelope.

4. An educational and amusement device comprising an envelope having an object depicted in color upon one face thereof and a legend written upon an opposite face, and a number of small irregularly shaped pieces corresponding in color to the color of the object on the envelope and adapted when assembled in a correct interfitting relation to represent in size and shape said object, said pieces each having a portion of the legend thereon, such portions of the legend being arranged in a definite sequence such that when the pieces are properly assembled to form the object the legend will be made to appear in the same order in which it is represented upon the envelope.

In testimony whereof I affix my signature.

THERESA M. DEGHERI.